July 16, 1963     A. E. DENTON ET AL     3,098,014
ENZYMATIC REMOVAL OF MEAT FROM BONES
Filed April 28, 1960     2 Sheets-Sheet 1
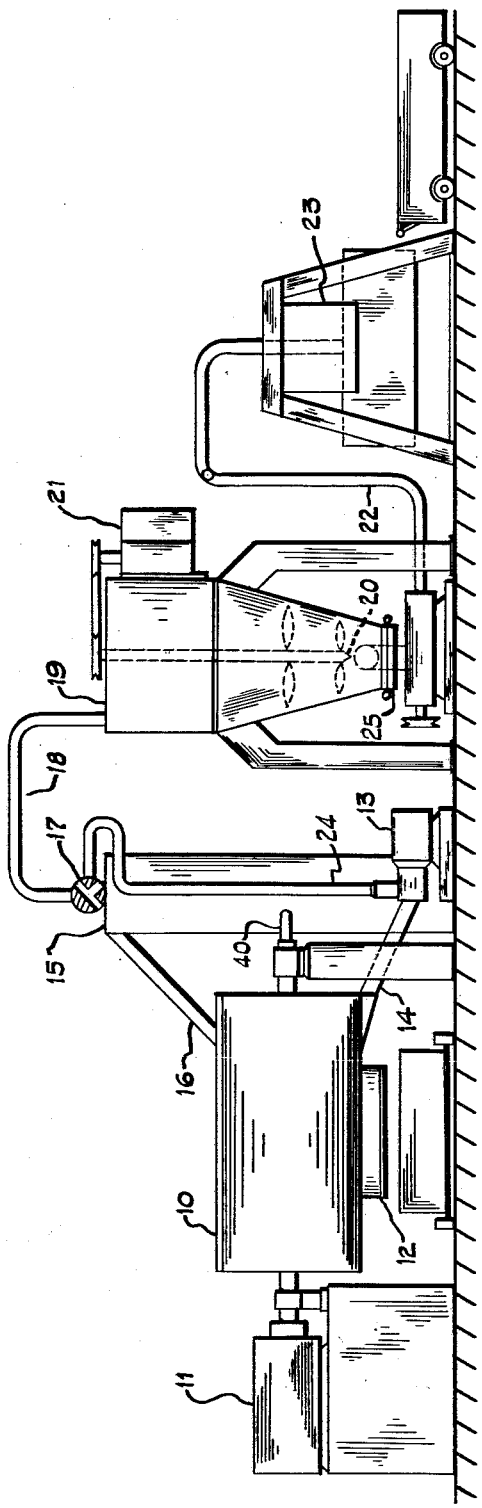
Arnold E. Denton
John M. Hogan
William J. McBrady
Jack F. Beuk
           INVENTORS
BY    R. G. Story
          ATTORNEY

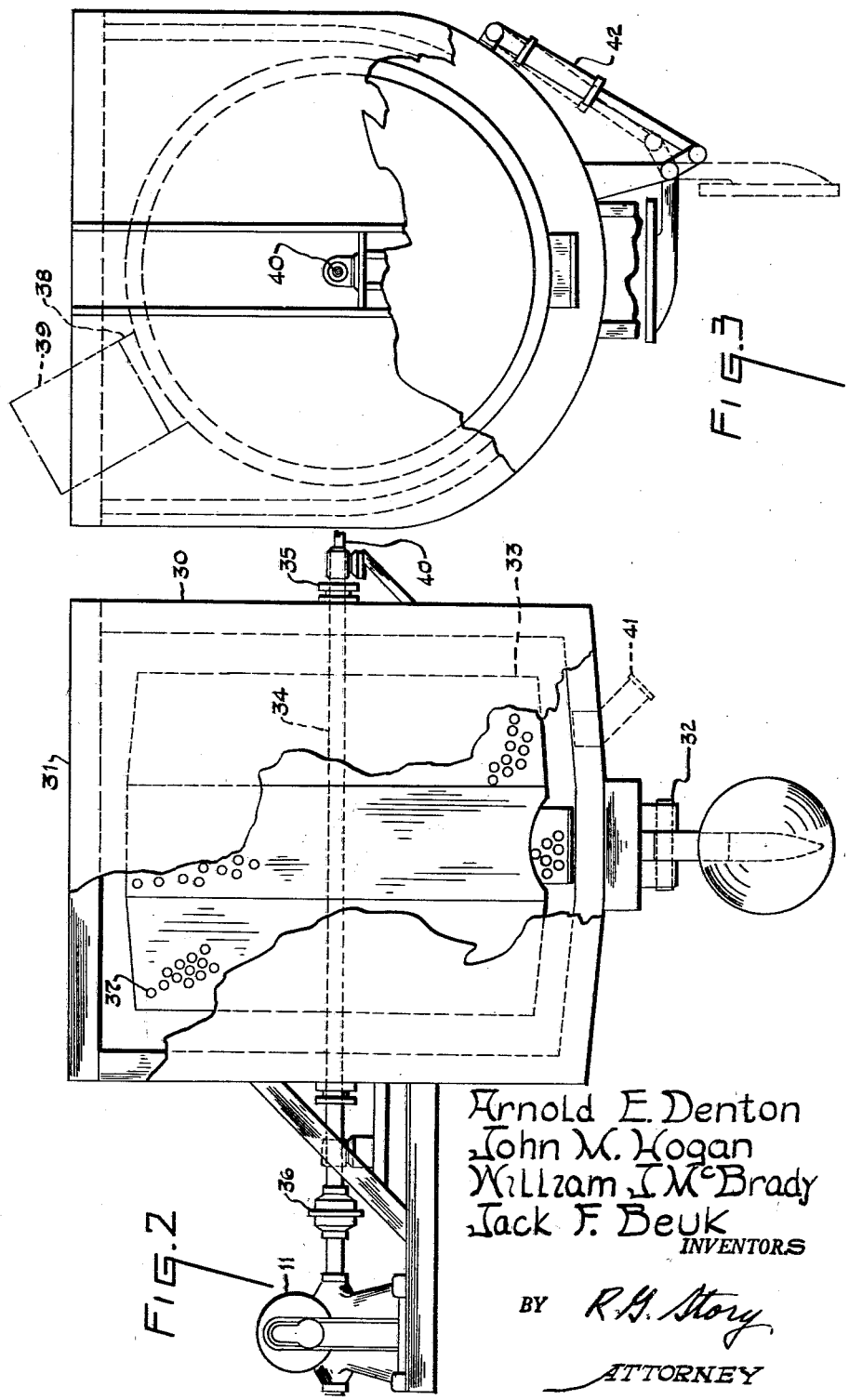

United States Patent Office 3,098,014
Patented July 16, 1963

3,098,014
ENZYMATIC REMOVAL OF MEAT FROM BONES
Arnold E. Denton, Moorestown, N.J., and Jack F. Beuk, Hinsdale, John M. Hogan, Oak Lawn, and William J. McBrady, Chicago, Ill., assignors to Swift & Company, Chicago, Ill., a corporation of Illinois
Filed Apr. 28, 1960, Ser. No. 25,273
9 Claims. (Cl. 195—2)

This invention relates to the recovery of meat from bones and more particularly to an improved method for treating meat products to separate the bone and cartilaginous material from meat.

In the preparation of animal carcasses for the marketing of meat derived from such carcasses, it is difficult and expensive to remove all of the meat from the animal bone, and a certain amount of meat is usually left on the bones because the cost of removing the last small pieces is prohibitive. Therefore, a certain amount of the meat is left on the bone and is, to a large degree, wasted since it is sold at a lower price as part of the bone rather than as meat. Furthermore, many animal parts are of a size and shape which renders meat removal from the bones very difficult because of the lack of adaptability to machine and other rapid processing techniques. With such parts it is often necessary to resort to hand labor for the boning step. Hand boning represents a slow and costly operation resulting in a higher cost product than can be prepared by rapid mechanized techniques.

It is, therefore, an object of this invention to provide an improved method for recovering meat from bones in a more rapid and efficient manner than has been proposed heretofore.

Another object of the invention is the provision of a method for obtaining an improved yield of meat of desirable flavor and texture from bones having meat attached thereto.

Still another object of the invention is the provision of a meat product having a desirable texture not ordinarily associated with meats obtained by mechanical removal means.

Additional objects, if not specifically set forth herein, will be readily apparent to those skilled in the art from the drawings and detailed description of the invention which follow.

Generally, the invention comprises a combined chemical-mechanical process for freeing animal flesh from the skeletal parts to which such flesh is attached, the method being free of the limitations ordinarily imposed by shape of the body part, percentage of meat on the bone, etc. The method is applicable to such fowl parts as necks, backs and wings, which are considered difficult to handle because of size and shape. Additionally, the bones of livestock such as cattle, sheep and hogs which have been boned by hand and carry only small pieces of meat can be treated by the present method to recover a large portion of the meat free from the bone. The process comprises subjecting the meat-carrying bones to the action of proteolytic enzymes to at least partially release the meat from the bone, coupled with a rolling mechanical action which, when combined with the enzyme treatment, results in a substantially complete separation of bone-free meat from skeletal parts substantially cleaned of meat. The method has application to parts of meat-bearing animals such as cattle, sheep, calves, hogs, poultry, turkeys and other animals providing flesh meat consumed by humans.

More specifically, it is within the contemplation of this invention to remove meat from bones to which it is attached by subjecting a mixture of the meat-bearing bones and a proteolytic enzyme to an elevated temperature while the bones are agitated. The combined action of the enzyme on the connective tissue holding the meat to the bone and the mechanical action which causes the bones to be moved with respect to one another and with respect to the solution carrying the enzyme results in a surprisingly efficient separation of the meat and bone. Moreover, a very attractive, palatable meat results since the heating required to facilitate enzyme action is much less than that which is necessary in cooking the product to cause the meat to shrink away from the bone. Cooking of the meat and bones at a high temperature, or for a long period of time at a moderate temperature, tends to deleteriously affect the flavor and general attractiveness of the product. When the enzyme has been permitted to act to a sufficient degree, the mixture is subjected to an enzyme inactivation step in order to halt enzyme action and prevent objectionable peptonization. The bones are then separated from the detached meat and the meat product is recovered as a striated tissue rather than as a solution or suspension of small particles, as would be the case if excessive enzymatic action were permitted.

Proteolytic enzymes are utilized in the process for facilitating removal of the attached meat. Any one or more of various proteolytic enzymes, singly or in combination, which are effective at a pH from about pH 4.0 to 7.0 may be employed in carrying out the invention. Proteolytic enzymes of plant origin, proteolytic enzymes of animal origin, and proteolytic enzymes derived from bacterial or fungal sources which preferentially attach connective tissue at the temperatures employed are suitable for this purpose. Papain, ficin, and bromelin are desirable plant-derived proteolytic enzymes, while animal-derived proteolytic enzymes include trypsin, pancreatin and chymotrypsin. Typical proteolytic enzymes derived from molds such as *Aspergillus oryzae*, *Aspergillus alliaceus*, and *Aspergillus wentii* may also be employed in the process.

Bacterially-derived enzymes are those isolated from the overall culture of bacterial organisms such as *Bacillus mesenteroides*, *Bacterium subtilis*, and *Clostridium welchii*. Of the various enzymes which may be employed in the process, those proteolytic enzymes of plant origin are preferred.

The quantity of enzyme employed in the process is variable and depends upon several factors such as the type and activity of the enzyme, the type of animal bones being treated, the time of heating and the temperature to which the enzyme-meat-bone mixture is heated. Usually where enzymes of plant origin are employed, the quantity of enzyme required to obtain release of the meat from the bone will be about 5–150 mg. enzyme/pound of meat and bone. Fungal enzymes in amounts of about 10–600 mg. enzyme/pound of meat and bone may be used, while larger amounts, around 10–1500 mg. enzyme/pound of meat and bone of the bacteria-derived enzymes can be employed.

Generally, as the amount of a given enzyme employed in the process is increased, the time and temperature of heating can be decreased and equivalent results obtained. Also, heating at temperatures at the high end of the temperature range of enzyme activity coupled with vigorous agitation permits the use of smaller amounts of enzyme.

After heating the mixture of enzyme and meat-containing bones under vigorous agitation for a time sufficient to initiate efficient removal of the meat, the temperature of heating is increased to about 205–215° F. or above to complete the processing and to inactivate the enzyme. Agitation of the mixture is then stopped and bone particles are permitted to settle out. The slurry of meat and water is removed from the separated bones and the meat slurry is subjected to centrifugation or other separation technique to remove the striated meat pieces from the water.

Ideally, it is desired to promote enzyme activity specifically directed to the breakdown of collagen and elastin as distinguished from activity on muscle fiber inasmuch as the connective tissue holding the meat to the bone is primarily collagen and elastin. Enzyme action on the muscle fiber making up the bulk of the meat should be held to a minimum although, in some cases, the tenderizing action of the enzyme on the muscle fiber may be desirable. Therefore, the specific enzyme and the treating temperature should be selected so as to insure a maximum of enzyme activity on the collagen and elastin and a minimum enzyme activity on muscle fiber. It has been found in a study of the activity of certain enzymes on collagen and on muscle fiber that the majority of the proteolytic enzyme preparations exhibit greatest proteolytic action on collagen and elastin at slightly higher temperatures than the temperatures at which maximum activity on muscle tissue occurs. Also, the temperature ranges of optimum collagen and elastin activity and optimum muscle fiber activity overlap. It can be stated generally that while some enzyme action takes place at temperatures of about 100° F.–190° F., the greatest activity of a given enzyme on collagen takes place in the range 130–180° F. while the greatest activity of the same enzyme on muscle fiber takes place in the range 100–150° F. The following table shows the temperature at which specific enzymes act on collagen and on muscle fiber:

| Enzyme | Temperature of Greatest Activity on Connective Tissue, ° F. | Temperature of Greatest Activity on Muscle Fiber, ° F. |
| --- | --- | --- |
| Bacterially-derived enzyme | 130–160 | 100–150 |
| Proteolytic enzyme derived from fungal source | 130–150 | 100–150 |
| Papain | 140–180 | 100–180 |
| Ficin | 140–180 | 130–160 |
| Bromelin | 140–160 | 140–160 |
| Fungal Protease | 130–140 |  |

It should be noted that as the temperature of maximum activity of a given enzyme on a particular type of tissue is exceeded, enzyme activity decreases markedly until at higher temperatures the enzyme is inactivated.

It is clear from the foregoing that the preferred enzyme composition is one which has a high degree of activity in reducing or softening collagen and elastin which are found in the connective tissue but less activity against muscle fiber. Also, for a given enzyme preparation it is desirable to first determine the temperature range within which the activity in reducing or softening collagen is greatest. It is thus possible to insure a high degree of breakdown of connective tissue with a minimum of enzyme activity on muscle fiber. In view of these considerations it is not possible to define a specific range of temperatures within which it is desirable to heat the meat-water-enzyme solution inasmuch as the amount of heating, both with respect to the maximum temperature attained and the time during which this temperature is maintained, will vary considerably with the specific enzyme employed. It should also be understood that the type of meat being treated will have an effect upon the conditions under which the meat separation step is carried out. In general, it can be stated that the heating step should take place at a temperature in the range 100–190° C. However, it is desirable to heat the mixture of enzyme bones and water to around 150–180° C. in order to insure that enzyme action on muscle fiber is minimized.

A device designed to accomplish the process is shown in FIGURE 1 wherein a kettle and agitator device shown generally at 10 for thoroughly agitating a water solution containing enzyme and bones having meat attached thereto is illustrated. The agitator is driven by a motor 11 and is equipped with a discharge gate 12 for removal of pieces of bone. A pump 13 is employed to convey the meat-liquid slurry through conduit 14 to intermediate tank 15, and the slurry is recycled to the agitator by means of overflow trough or conduit 16. In the intermediate tank, any bone particles present are permitted to drop to the bottom and the slurry is recirculated to the container or kettle. It will be noted that conduit 24 enters the intermediate tank 15 at the top and the slurry containing small pieces of bone is dropped into the top of the tank. The bone particles settle to the bottom of the tank while the liquid is returned to the agitator through pipe 16, which is located adjacent the top of the tank away from any accumulated bone particles. An exit door in the tank (not shown) is provided for removal of accumulated bone particles. The three-way valve 17 permits by-passing of this settling tank after the meat is substantially removed from the bones. After inactivation of the enzyme, the slurry is pumped through valve 17 and conduit 8 to separating tank 19. The separating tank is equipped with suitable agitating means 20 driven by a motor or other source of power 21. Gentle mixing of the slurry is effected in the separating tank and bone particles are further separated out by gravity. Bone particles may be removed after a series of runs through door 25. The slurry is then conveyed by pump through conduit 22 to a second separating means, basket centrifuge 23, where suspended meat particles are removed and the fat-water effluent is available, if desired, for further clarification to recover the fat. The intermediate separating tank is useful in separating small pieces of bone which pass through the openings in the basket during agitation. Although not necessarily required, it does insure a rapid and smooth operation.

FIGURE 2 is a side view partly in section of the tank and agitator device. The tank and agitator include a housing or tank 30 equipped with a lift-off cover 31 and a dump door 32. Mounted within the housing is a generally cylindrical basket 33 carried on a shaft 34 which is operatively associated through packing glands 35 and coupling 36 to motor 11. The cylindrical basket contains perforations 37 and a loading door 38 into which can be inserted a removable loading chute 39 (see FIGURE 3). The tank or housing may be adapted with an entry port 40 for direct steam injection into the body of the agitator, or a steam jacket may be used. Outlet conduit 41 is connected to a pump (not shown) which is used to transport the bone-meat-water slurry to the intermediate tank.

In FIGURE 3, which represents a section taken through 2—2 of FIGURE 2, the removable loading chute can be seen more clearly. Also, in this figure, a hydraulic cylinder 42 for actuating the dump door is clearly illustrated.

The water solution of the enzyme and meat-carrying bones is placed in the agitator and the mixture is heated and subjected to a rolling action. This rolling action causes the bones to be moved both with respect to each other and with respect to the solution. The bones act as abrasives to one another and the meat which has been loosened by the enzyme action on the connective tissue holding the meat to the bone is freed. As the speed of agitation is increased and enzyme concentration is decreased, the meat is removed in chunks of increased size.

While the following examples are intended to illustrate specific embodiments of the invention, they are to be considered in no way limitative:

*Example I*

A batch of 6.37 pounds of chicken necks and backs and 8 pounds of water containing 10 milligrams papain for each pound of chicken parts and water was heated during vigorous rolling agitation in an agitator. The mixture was heated to 160° F. and the temperature was maintained between 160–170° F. for 1 hour with constant rolling agitation. At the end of this time, the temperature was increased to about 210° F. and held at this level for about 20 minutes. After removal of the bone particles by gravity and separation of the meat from water, the recovered meat product was examined. It was found that the meat was recovered in the form of striated tissue. The back and neck bones were weighed and it was discovered that there was a 54% reduction in the weight of the backs and necks.

*Example II*

A charge of 6.19 pounds of chicken necks and backs and 8 pounds of water containing 20 milligrams papain per pound of mixture was heated and agitated in the same manner as that set forth in Example I above. The percent meat removal was calculated to be 53%.

A similar run conducted in the same fashion with the exception that the enzyme concentration was increased to 40 milligrams per pound of mixture resulted in a yield of 69% meat and the bones were absolutely devoid of meat. However, the slurry obtained possessed a bitter flavor. Since this bitter flavor, which results from some peptonization, is soluble in the aqueous portion of the slurry, the bitterness is removed when the meat is separated from the water.

*Example III*

A mixture of 12 pounds water and 5 pounds crushed beef bone was placed in a steam jacketed agitator kettle and papain in a concentration of 40 milligrams per pound of the beef bone-water mixture was added. The mixture was subjected to rolling agitation during heating to about 160° F. The temperature was maintained at about 160–170° F. for 45 minutes. Inactivation was obtained by heating at about 205° F. for 20 minutes. The reduction in weight of the bone charge was about 50%.

*Example IV*

A mixture of 436 pounds of fowl necks and 456 pounds of water was charged into the basket agitator kettle. A quantity of papain amounting to 20 milligrams per pound of mix was added. The temperature of the solution was raised to about 160° F. and the bones having the meat attached thereto were subjected to a rolling agitation. The temperature was held between 160° F. and 170° F. for 40 minutes and then elevated to 212° F. and held at the boiling temperature for 20 minutes. The meat-water slurry was separated from the bone and bones which were practically clean of particles were weighed. The decrease in the weight of the bones over the original weight of the fowl necks was 68.6%. The meat after separation from the water slurry is essentially in its original striated form. The separated water-aqueous solution was practically clear, indicating that it contained a very little solubilized protein.

With the basket-type agitator shown in the drawings, the water can surround and pass through the basket and pieces of meat can pass out of the basket into the bottom of the kettle. The heating of the bone-water-enzyme mixture is generally carried out for about 30 minutes to about 1 hour while the enzyme inactivation step is carried out at about the boiling temperature of the mixture. The meat which is detached from the bone is classified by a settling procedure wherein the bones are permitted to gravitate to the bottom and the meat, water and fat layer can be separated. It is apparent that the enzyme-water-meat-containing bone mixture should be heated to a temperature and for a time sufficient to effect removal of the meat from the bone, but not sufficient to cause peptonization and resultant bitter flavors. If the mixture is heated too long or at too high a temperature, there is some development of bitterness in the product, although these flavor materials are water-soluble and are for the most part removed during the centrifugation step. Duration of the heating period at a given temperature is easily determined by observing how much of the meat is removed from the bones. When the meat is substantially removed from the bones the heat and agitation is terminated. As little as 15 minutes heating will be sufficient in isolated cases and up to about 4 hours will be required in others. It has been found that at the better working temperatures the heating is carried out for about 30–90 minutes.

Obviously many modifications and variations of the invention as hereinbefore set forth may be made without departing from the spirit and scope thereof, and therefore only such limitations are to be imposed as are indicated in the appended claims.

We claim:

1. A method for removing meat from bones having meat attached thereto comprising mixing meat-containing bones with water and a proteolytic enzyme, heating said mixture to enhance the activity of said enzyme and cause said meat to be partially freed from said bones, agitating said mixture and moving said bones relative to one another to exert pressure and friction on one another further freeing said meat from said bones, inactivating said enzyme, and removing the liquid phase of said mixture from said freed meat.

2. A method for removing meat from bones comprising heating meat-containing bones in a liquid carrier in the presence of a proteolytic enzyme to an elevated temperature, agitating said bones and said liquid at said elevated temperature and maintaining a rolling contact of said bones with respect to each other and with respect to said liquid, inactivating said enzyme, separating said liquid carrier containing said meat from the substantially de-meated bones and separating said liquid carrier from said meat.

3. A method of removing meat from bones having meat attached thereto comprising partially freeing said meat from said bones by enzymic action, subjecting said bones containing partially freed meat to a rolling action to cause said bones to move with pressure and friction with respect to one another and further free said meat, and separating said bones from said freed meat.

4. A method for removing meat from poultry bones having meat attached thereto comprising placing the meat-containing bones in an aqueous solution of a proteolytic enzyme, heating and agitating said aqueous solution containing said meat-containing bones, moving said bones with respect to one another to cause removal of said meat from said bones by enzymic and mechanical action, separating the de-meated bones from said aqueous solution containing freed meat particles and finally separating said meat particles from said aqueous solution.

5. A method for removing meat from bones comprising mixing meat-containing bones with an aqueous solution of papain, heating said mixture to enhance the activity of said papain and cause said meat to be partially freed from said bones, agitating said heated mixture and moving said bones with respect to one another to cause further freeing of said meat from said bones by mechanical action, inactivating said enzyme and removing the liquid phase of said mixture from said freed meat.

6. A method of removing meat from bones having meat attached thereto comprising partially freeing said meat from said bones by enzymic action with papain, subjecting said bones containing partially freed meat to a mechanical rolling action to further free said meat from said bones and separating the substantially de-meated bones from said meat.

7. The method of claim 1 wherein the degree of heating of said mixture is adjusted to a temperature in the range of optimum connective tissue activity for said enzyme.

8. A method for removing meat from bones comprising contacting meat-containing bones with water and a proteolytic enzyme to form a mixture of meat-containing bones and said enzyme, heating said mixture to a temperature in the range of maximum connective tissue activity for said enzyme, agitating said mixture and moving said bones relative to one another and exerting pressure and friction on one another whereby to free said meat from said bones and further heating said mixture to a temperature sufficient to inactivate said enzyme.

9. A method for removing meat from bones comprising: mixing bones having meat attached thereto by connective tissue with an aqueous solution of a proteolytic enzyme, heating the mixture at a temperature and for a time sufficient to promote maximum collagen and elastin activity of said enzyme, but insufficient to promote muscle fiber breakdown by said enzyme, agitating said heated mixture to free said meat from said bones by mechanical action, inactivating said enzyme, and removing the liquid phase of said mixture from said freed meat.

References Cited in the file of this patent
UNITED STATES PATENTS

| | | |
|---|---|---|
| 2,423,102 | Keil | July 1, 1947 |
| 2,798,251 | Lott | July 9, 1957 |
| 2,851,362 | Goldberg | Sept. 9, 1958 |
| 2,858,222 | Harris et al. | Oct. 28, 1958 |
| 2,895,162 | Harris | July 21, 1959 |
| 2,904,442 | Underkofler | Sept. 15, 1959 |